United States Patent
Ji et al.

(10) Patent No.: US 10,555,311 B2
(45) Date of Patent: *Feb. 4, 2020

(54) DATA TRANSMISSION METHOD AND APPARATUS BASED ON NETWORKS OF MULTIPLE COMMUNICATIONS STANDARDS

(71) Applicant: Huawei Technologies Co., Ltd., Shenzhen, Guangdong (CN)

(72) Inventors: Jiagang Ji, Shenzhen (CN); Weihua Dai, Shenzhen (CN); Dan Jiang, Munich (DE)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/832,489

(22) Filed: Dec. 5, 2017

(65) Prior Publication Data
US 2018/0098329 A1    Apr. 5, 2018

Related U.S. Application Data

(63) Continuation of application No. 14/715,069, filed on May 18, 2015, now Pat. No. 9,867,198, which is a
(Continued)

(30) Foreign Application Priority Data

Nov. 19, 2012  (CN) .......................... 2012 1 0468177

(51) Int. Cl.
*H04W 72/04* (2009.01)
*H04W 48/18* (2009.01)
(Continued)

(52) U.S. Cl.
CPC ....... *H04W 72/0486* (2013.01); *H04W 28/22* (2013.01); *H04W 48/18* (2013.01); *H04W 28/08* (2013.01); *H04W 88/06* (2013.01)

(58) Field of Classification Search
CPC .............. H04W 48/18; H04M 1/72563; H04L 43/0829; H04L 43/0888; H04L 25/14
See application file for complete search history.

(56) References Cited

U.S. PATENT DOCUMENTS

| 7,433,707 | B2 | 10/2008 | Kaminski et al. |
| 7,761,098 | B1 | 7/2010 | Nguyen et al. |

(Continued)

FOREIGN PATENT DOCUMENTS

| CN | 101163975 A | 4/2008 |
| CN | 101207900 A | 6/2008 |

(Continued)

*Primary Examiner* — Melanie Jagannathan
(74) *Attorney, Agent, or Firm* — Womble Bond Dickinson (US) LLP

(57) ABSTRACT

The present invention provides a data transmission method and apparatus based on networks of multiple communications standards. According to the method of the present invention, an air interface state of a first communications standard network and an air interface state of a second communications standard network are detected, a data packet sending rate suitable for the air interface status of the first communications standard network and a data packet sending rate suitable for the air interface state of the second communications standard network are determined, and a data packet is allocated to the first communications standard network and the second communications standard network according to the determined data packet sending rates, so that the data packet may be simultaneously delivered to a user by using the networks of the two communications standards together.

18 Claims, 9 Drawing Sheets

Related U.S. Application Data continuation of application No. PCT/CN2013/085918, filed on Oct. 24, 2013.

(51) Int. Cl.
*H04W 28/22* (2009.01)
*H04W 28/08* (2009.01)
*H04W 88/06* (2009.01)

(56) References Cited

U.S. PATENT DOCUMENTS

| | | |
|---|---|---|
| 8,447,299 B1 | 5/2013 | Nguyen et al. |
| 2004/0165530 A1 | 8/2004 | Bedekar et al. |
| 2005/0249157 A1 | 11/2005 | Qian et al. |
| 2009/0296652 A1 | 12/2009 | Rudowicz et al. |
| 2010/0099405 A1 | 4/2010 | Brisebois et al. |
| 2010/0159976 A1 | 6/2010 | Marocchi et al. |
| 2012/0051299 A1 | 3/2012 | Thakolsri et al. |
| 2012/0163283 A1 | 6/2012 | Kim et al. |
| 2012/0196579 A1* | 8/2012 | Souissi .............. H04L 25/14 455/414.4 |
| 2012/0260296 A1 | 10/2012 | Mallet et al. |
| 2013/0272130 A1 | 10/2013 | Zhang |
| 2014/0024375 A1 | 1/2014 | Fitzpatrick et al. |
| 2014/0071840 A1 | 3/2014 | Venancio |

FOREIGN PATENT DOCUMENTS

| | | |
|---|---|---|
| CN | 102006628 A | 4/2011 |
| CN | 102386999 A | 3/2012 |
| CN | 102448199 A | 5/2012 |
| CN | 102665142 A | 9/2012 |
| CN | 102761388 A | 10/2012 |
| CN | 102970711 A | 3/2013 |

* cited by examiner

DATA TRANSMISSION METHOD AND APPARATUS BASED ON NETWORKS OF MULTIPLE COMMUNICATIONS STANDARDS

CROSS-REFERENCE TO RELATED APPLICATIONS

This application is a continuation of U.S. patent application Ser. No. 14/715,069, filed on May 18, 2015, which is a continuation of International Application No. PCT/CN2013/085918, filed on Oct. 24, 2013. The International Application claims priority to Chinese Patent Application No. 201210468177.5, filed on Nov. 19, 2012. All of the aforementioned patent applications are hereby incorporated by reference in their entireties.

TECHNICAL FIELD

The present invention relates to communications technologies, and in particular, to a data transmission method and apparatus based on networks of multiple communications standards.

BACKGROUND

At present, an increasing number of operators deploy networks of multiple communications standards, and a multimode base station also becomes a mainstream choice. However, in the prior art, services of different communications standards operate independently inside a multimode base station, and therefore a data service can be transmitted in a network of only one communications standard at a time. Although a network of a selected communications standard is generally of a communications standard with a relatively high data transmission rate, the data transmission rate of the network of the communications standard decreases when an air interface link in the network of the selected communications standard is in a poor state. In this case, as a status of the air interface link in the network of the selected communications standard does not reach a set threshold, a data service cannot be switched to a relatively idle network of another communications standard in which an air interface link is in a better state and a data transmission rate is relatively high. Consequently, an air interface resource of the relatively idle network of the other communications standard cannot be fully utilized.

SUMMARY

In view of this, embodiments of the present invention provide a data transmission method and apparatus based on networks of multiple communications standards, so as to implement binding of radio links in the networks of the multiple communications standards, so that load balancing can be performed among the networks of the multiple communications standards, and a wider data channel can be formed, thereby improving data transmission efficiency and reliability.

A first aspect provides a data transmission method based on networks of multiple communications standards, including:
detecting an air interface status parameter of a first communications standard network and an air interface status parameter of a second communications standard network;
decreasing a data packet sending rate of a communications standard network with an air interface status parameter less than a preset threshold in a case in which such a communications standard network exists; and
allocating, according to a data packet sending rate of the first communications standard network and a data packet sending rate of the second standard network, a data packet to the first communications standard network and the second communications standard network for sending.

In a first possible implementation manner, the method further includes:
increasing a data packet sending rate of a communications standard network with a decreased data packet sending rate in a case in which an air interface status parameter of the communications standard network is not less than the preset threshold.

With reference to the first possible implementation manner of the first aspect, in a second possible implementation manner of the first aspect, the increasing a data packet sending rate of a communications standard network with a decreased data packet sending rate in a case in which an air interface status parameter of the communications standard network is not less than the preset threshold includes:
detecting the air interface status parameter of the communications standard network with the decreased data packet sending rate; and
in a case in which the air interface status parameter of the communications standard network with the decreased data packet sending rate is not less than the preset threshold, increasing the data packet sending rate of the communications standard network to a rate before the decrease.

With reference to the first possible implementation manner of the first aspect, in a third possible implementation manner of the first aspect, the preset threshold includes multiple threshold values, and each threshold value is corresponding to one data packet sending rate.

With reference to the third possible implementation manner of the first aspect, in a fourth possible implementation manner of the first aspect, the decreasing a data packet sending rate of a communications standard network with an air interface status parameter less than a preset threshold if such a communications standard network exists, includes:
if there is a communications standard network with an air interface status parameter less than at least one threshold value of the preset threshold, decreasing a data packet sending rate of the communications standard network to a data packet sending rate corresponding to a smallest threshold value among the at least one threshold value.

With reference to the third possible implementation manner of the first aspect or the fourth possible implementation manner of the first aspect, in a fifth possible implementation manner of the first aspect, the increasing a data packet sending rate of a communications standard network with a decreased data packet sending rate in a case in which an air interface status parameter of the communications standard network is not less than the preset threshold includes:
detecting the air interface status parameter of the communications standard network with the decreased data packet sending rate; and
in a case in which the air interface status parameter of the communications standard network with the decreased data packet sending rate is not less than any threshold value of the preset threshold, increasing the data packet sending rate of the communications standard network to a rate before the decrease.

A second aspect provides a data transmission apparatus based on networks of multiple communications standards, including:

a detecting module, configured to detect an air interface status parameter of a first communications standard network and an air interface status parameter of a second communications standard network, and send a detecting result to a rate adjusting module;

the rate adjusting module, configured to: according to the detecting result of the detecting module, decrease a data packet sending rate of the communications standard network with an air interface status parameter less than a preset threshold in a case in which such a communications standard network exists, and send a determined data packet sending rate of the first communications standard network and a determined data packet sending rate of the second communications standard network to an allocating module; and the allocating module, configured to allocate, according to the data packet sending rate of the first communications standard network and the data packet sending rate of the second communications standard network that are determined by the rate adjusting module, a data packet to the first communications standard network and the second communications standard network for sending.

In a first possible implementation manner of the second aspect, the apparatus further includes:

a rate restoring module, configured to: in a case in which an air interface status parameter of a communications standard network with a decreased data packet sending rate is not less than the preset threshold, increase the data packet sending rate of the communications standard network.

With reference to the first possible implementation manner of the second aspect, in a second possible implementation manner of the second aspect, the rate restoring module includes:

a first detecting submodule, configured to detect the air interface status parameter of the communications standard network with the decreased data packet sending rate, and send a detecting result to a first rate increasing submodule; and the first rate increasing submodule, configured to: according to the detecting result of the first detecting submodule and in a case in which the air interface status parameter of the communications standard network with the decreased data packet sending rate is not less than the preset threshold, increase the data packet sending rate of the communications standard network to a rate before the decrease.

With reference to the first possible implementation manner of the second aspect, in a third possible implementation manner of the second aspect, the preset threshold includes multiple threshold values, and each threshold value is corresponding to one data packet sending rate.

With reference to the third possible implementation manner of the second aspect, in a fourth possible implementation manner of the second aspect, the rate adjusting module is configured to: according to the detecting result of the detecting module and in a case in which there is a communications standard network with an air interface status parameter less than at least one threshold value of the preset threshold, decrease a data packet sending rate of the communications standard network to a data packet sending rate corresponding to a smallest threshold value among the at least one threshold value, and send the determined data packet sending rate of the first communications standard network and the determined data packet sending rate of the second communications standard network to the allocating module.

With reference to the third possible implementation manner of the second aspect or the fourth possible implementation manner of the second aspect, in a fifth possible implementation manner of the second aspect, the rate restoring module includes:

a second detecting submodule, configured to detect the air interface status parameter of the communications standard network with the decreased data packet sending rate, and send a detecting result to a second rate restoring submodule; and a second rate increasing submodule, configured to: according to the detecting result of the second detecting submodule and in a case in which the air interface status parameter of the communications standard network with the decreased data packet sending rate is not less than any threshold value of the preset threshold, increase the data packet sending rate of the communications standard network to a rate before the decrease.

It can be learned from the foregoing technical solutions that according to the present invention, a radio link of a first communications standard network and a radio link of a second communications standard network are used, so that a data packet may be simultaneously delivered to a user by using the networks of the two communications standards together, thereby fully utilizing bandwidth of the first communications standard network and bandwidth of the second communications standard network and increasing a data transmission rate; in addition, by detecting an air interface link status of a communications standard network, data transmission rates of networks of multiple communications standards are adjusted flexibly and dynamically, thereby improving data transmission reliability.

BRIEF DESCRIPTION OF THE DRAWINGS

To describe the solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
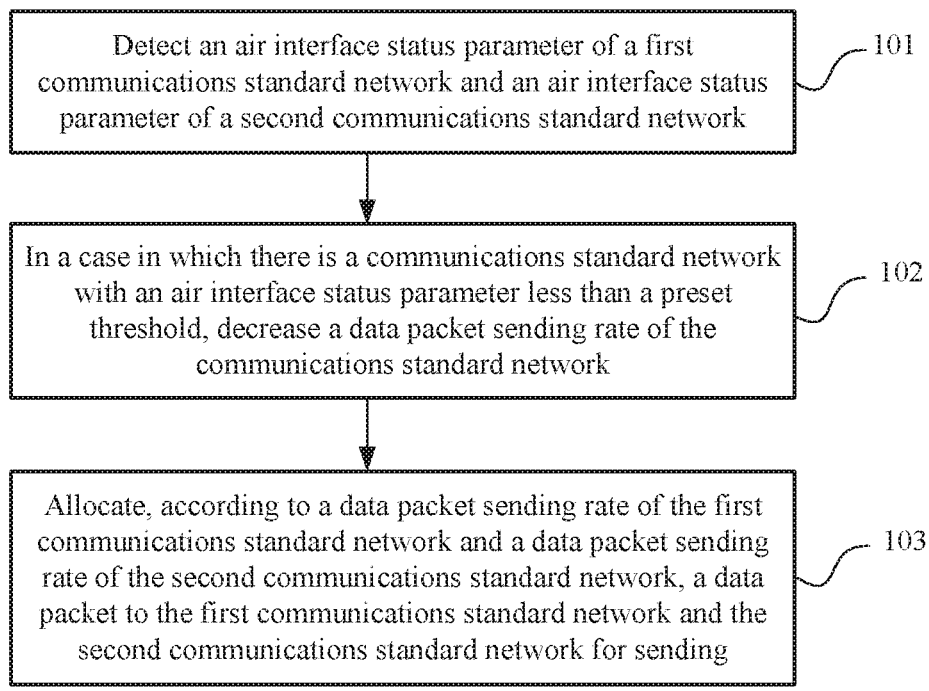
FIG. 1 is a schematic flowchart of a data transmission method based on networks of multiple communications standards according to an embodiment of the present invention.

FIG. 1 is a schematic flowchart of a data transmission method based on networks of multiple communications standards according to an embodiment of the present invention, and as shown in FIG. 1, the data transmission method based on networks of multiple communications standards according to the embodiment may include:

101: Detect an air interface status parameter of a first communications standard network and an air interface status parameter of a second communications standard network.

Optionally, the first communications standard network and the second communications standard network may separately be a Code Division Multiple Access (Code Division Multiple Access, CDMA for short) network, a Universal Mobile Telecommunications System (Universal Mobile Telecommunications System, UMTS for short) network, a Time Division-Synchronous Code Division Multiple Access (Time Division-Synchronous Code Division Multiple Access, TD-SCDMA for short) network, a Wideband Code Division Multiple Access (Wideband Code Division Multiple Access, WCDMA for short) network, a Long Term Evolution (Long Term Evolution, LTE for short) network, a Global System for Mobile Communications (Global System for Mobile Communications, GSM for short) network, a Worldwide Interoperability for Microwave Access (Worldwide Interoperability for Microwave Access, Wimax for short) network, and a Wireless Fidelity (Wireless Fidelity, WiFi for short) network.

Optionally, the air interface status parameter of the first communications standard network and the air interface status parameter of the second communications standard network may be forward signal-to-noise ratios that are at a multimode access point (Access Point, AP for short) and that are corresponding to the first communications standard network and the second communications standard network.

102: In a case in which there is a communications standard network with an air interface status parameter less than a preset threshold, decrease a data packet sending rate of the communications standard network.

Specifically, for a communications standard network with an air interface status parameter not less than the preset threshold, a data packet sending rate of the communications standard network is not adjusted, so that the communications standard network with the air interface status parameter not less than the preset threshold can perform data packet sending at an initial data packet sending rate.

Specifically, determining is separately performed on the first communications standard network and the second communications standard network according to the air interface status parameter of the first communications standard network and the air interface status parameter of the second communications standard network that are obtained by means of detecting in step 101, so as to determine whether the air interface status parameter of the first communications standard network is less than a preset threshold, and determine whether the air interface status parameter of the second communications standard network is less than a preset threshold, where the preset threshold that is set for the first communications standard network and the preset threshold that is set for the second communications standard network may be the same or maybe different; a data packet sending rate corresponding to the air interface status parameter of the first communications standard network less than the preset threshold and a data packet sending rate corresponding to the air interface status parameter of the second communications standard network less than the preset threshold may be set for the first communications standard network and the second communications standard network respectively in advance, where the set data packet sending rates may be the same or may be different.

103: Allocate, according to a data packet sending rate of the first communications standard network and a data packet sending rate of the second communications standard network, a data packet to the first communications standard network and the second communications standard network for sending.

Optionally, a quantity of data packets that are sent to a sending buffer of the first communications standard network and a quantity of data packets that are sent to a sending buffer of the second communications standard network may be dynamically adjusted according to the data packet sending rate of the first standard network and the data packet sending rate of the second standard network by using a backpressure mechanism. The first communications standard network and the second communications standard network obtain a data packet from their respective sending buffers for delivery at their respective data packet sending rates.

Optionally, the data packet may be an application layer (Layer 3) data packet.

Specifically, the allocating a data packet to the first communications standard network and the second communications standard network for sending may be interpreted as follows: both the first communications standard network and the second communications standard network are responsible for transmitting a part of all data packets of a service of a user, so that data packets received by the user from the first communications standard network and the second communications standard network jointly form complete service data required by the user.

Figure 2:
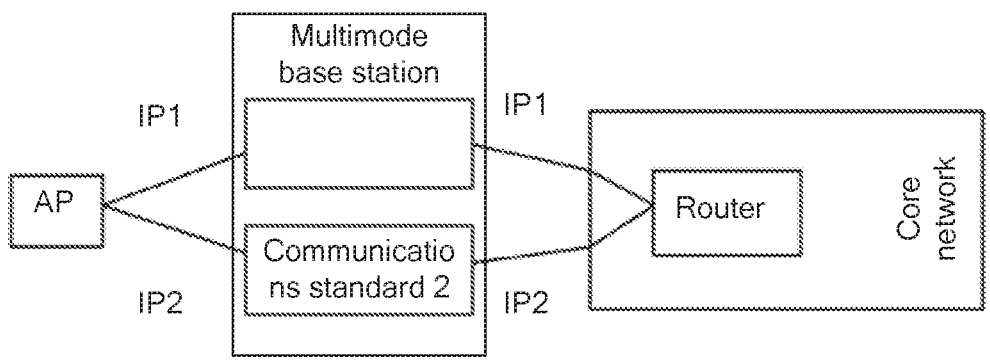
FIG. 2 is a schematic diagram of implementing, on a core network side, a method that is provided based on the embodiment in FIG. 1.

The method provided by the embodiment may be implemented on a core network side or a multimode base station side. As shown in FIG. 2, the method provided by the embodiment may be implemented by using a network element of a core network. For example, the method provided by the embodiment is implemented by a unified gateway (Unified Gateway, UGW for short), an independent service gateway (Service Gateway, SGW for short), and a packet data serving node (Packet Data Serving Node, PDSN for short) that are capable of implementing a router function. An application layer data packet is allocated by the core network, according to the method provided by the embodiment, to a first communications standard network and a second communications standard network that are inside the core network, and then is delivered to a multimode base station by a radio link of the first communications standard network and a radio link of the second communications standard network. The multimode base station sends the data packet received from the first communications standard network to an AP by using the radio link of the first communications standard network, and sends the data packet received from the second communications standard network to the AP by using the radio link of the second communications standard network, thereby fully utilizing bandwidth of the first communications standard network and bandwidth of the second communications standard network and increasing a data transmission rate.

Figure 3:
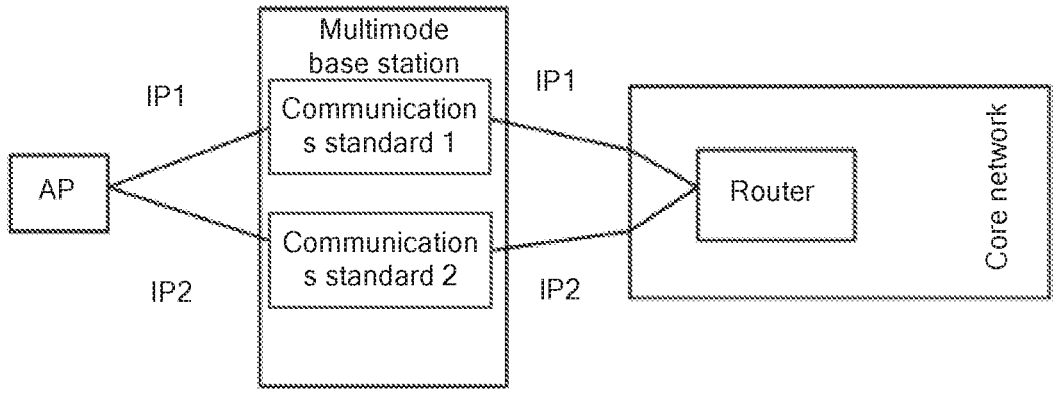
FIG. 3 is a schematic diagram of implementing, on a multimode base station side, a method that is provided based on the embodiment in FIG. 1.

As shown in FIG. 3, a router function may also be implemented inside a multimode base station. The multimode base station receives, from a core network, an application layer data packet that needs to be delivered to an access point AP, and allocates, according to the method provided by the embodiment, the received data packet to a first communications standard network and a second communications standard network that are inside the multimode base station, and the received data packet is delivered to the AP by using the first communications standard network and the second communications standard network separately, thereby fully utilizing bandwidth of the first communications standard network and bandwidth of the second communications standard network and increasing a data transmission rate.

According to the method of the embodiment, a radio link of a first communications standard network and a radio link of a second communications standard network are used, so that a data packet may be simultaneously delivered to a user by using the networks of the two communications standards together, thereby fully utilizing bandwidth of the first communications standard network and bandwidth of the second communications standard network and increasing a data transmission rate; in addition, by detecting an air interface link status of the first communications standard network and an air interface link status of the second communications standard network, data transmission rates of networks of multiple communications standards are adjusted flexibly and dynamically, thereby improving utilization efficiency of an air interface resource in the networks of the multiple communications standards.

Figure 4:
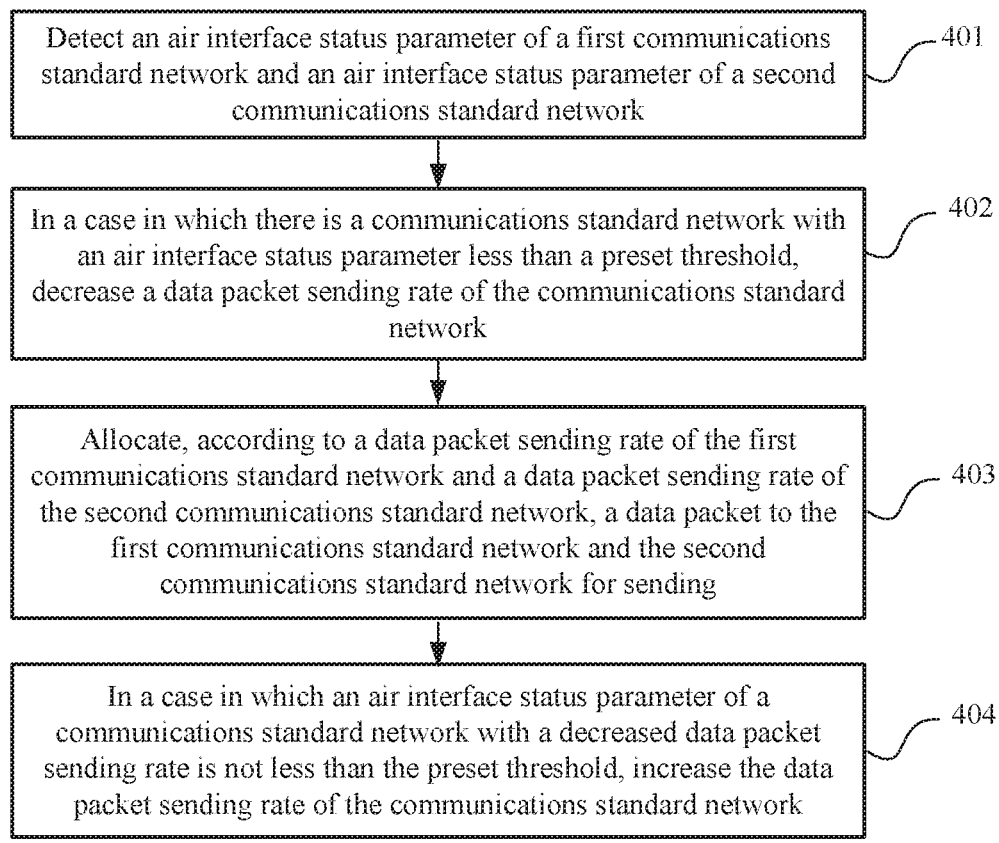
FIG. 4 is a schematic flowchart of a data transmission method based on networks of multiple communications standards according to another embodiment of the present invention.

FIG. 4 is a schematic flowchart of a data transmission method based on networks of multiple communications standards according to another embodiment of the present invention. The data transmission method based on networks of multiple communications standards according to the embodiment is an improvement of the method provided in FIG. 1. After a data packet sending rate of a communications standard network with an air interface status parameter less than a preset threshold is decreased by using the method provided in FIG. 1, the data packet sending rate of the communications standard network with a decreased sending rate needs to be increased in a timely manner, so that a bandwidth resource of networks of multiple communications standards can be fully and flexibly utilized. As shown in FIG. 4, the data transmission method based on networks of multiple communications standards according to the embodiment may include:

401: Detect an air interface status parameter of a first communications standard network and an air interface status parameter of a second communications standard network.

402: In a case in which there is a communications standard network with an air interface status parameter less than a preset threshold, decrease a data packet sending rate of the communications standard network.

403: Allocate, according to a data packet sending rate of the first communications standard network and a data packet sending rate of the second communications standard network, a data packet to the first communications standard network and the second communications standard network for sending.

404: In a case in which an air interface status parameter of a communications standard network with a decreased data packet sending rate is not less than the preset threshold, increase the data packet sending rate of the communications standard network.

Specifically, it may be regularly determined whether there is a network with a decreased data packet sending rate by detecting whether there is a communications standard network with a data packet sending rate lower than an initial data packet sending rate of the communications standard network. When it is determined that there is a network with a decreased data packet sending rate, an air interface status parameter of the network is detected by using step 404, and it is determined, according to a detecting result, whether to increase the data packet sending rate of the communications standard network. It may also be that execution of step 402 triggers step 404 to regularly detect an air interface status parameter of a network with a decreased data packet sending rate, and it is determined, according to a detecting result, whether to increase the data packet sending rate of the communications standard network.

Specifically, after the data packet sending rate of the communications standard network is increased, a data packet is allocated to the communications standard network according to an increased data packet sending rate.

According to the method of the embodiment, a radio link of a first communications standard network and a radio link of a second communications standard network are used, so that a data packet may be simultaneously delivered to a user by using the networks of the two communications standards together, thereby fully utilizing bandwidth of the first communications standard network and bandwidth of the second communications standard network and increasing a data transmission rate; in addition, by detecting an air interface link status of the first communications standard network and an air interface link status of the second communications standard network, data transmission rates of networks of multiple communications standards are adjusted flexibly and dynamically, thereby improving utilization efficiency of an air interface resource in the networks of the multiple communications standards.

Figure 5:
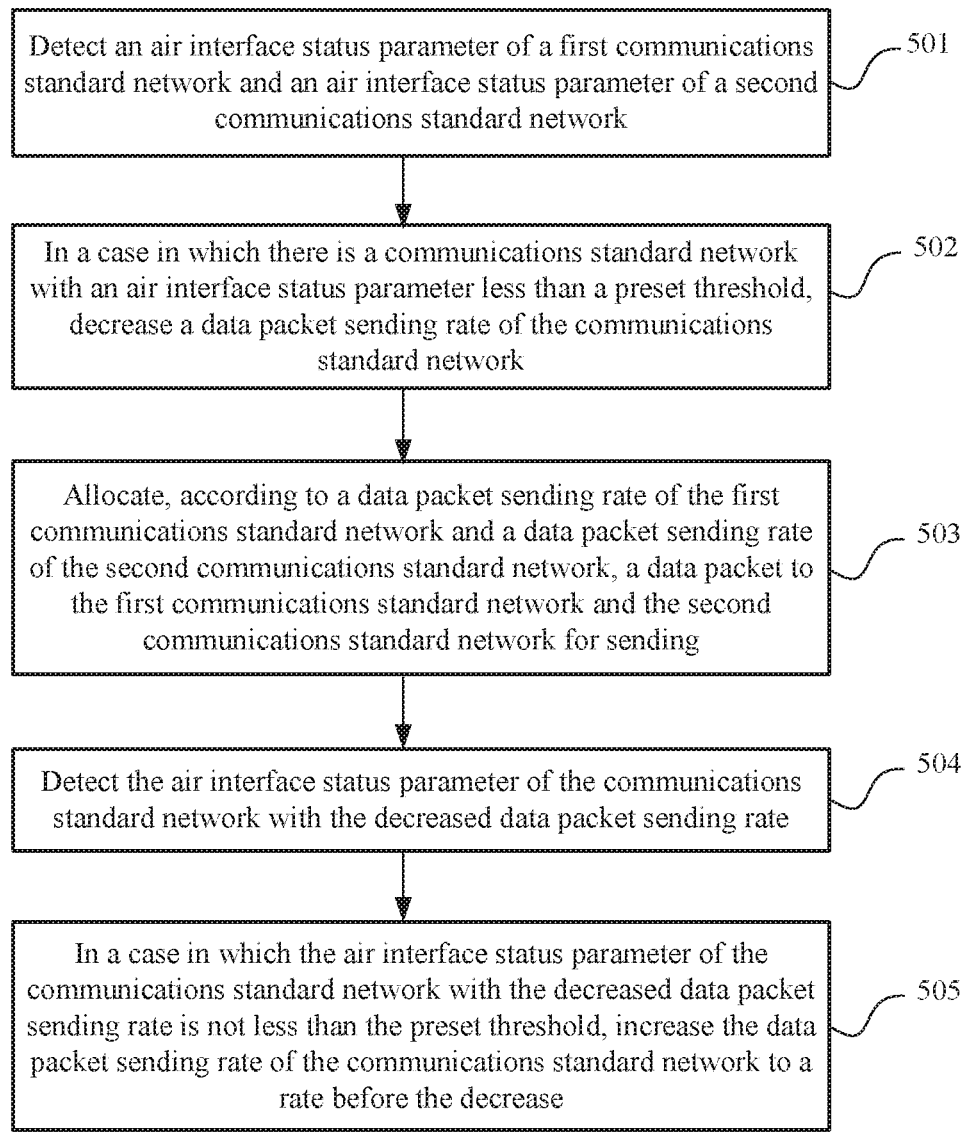
FIG. 5 is a schematic flowchart of a data transmission method based on networks of multiple communications standards according to another embodiment of the present invention.

FIG. 5 is a schematic flowchart of a data transmission method based on networks of multiple communications standards according to another embodiment of the present invention, and as shown in FIG. 5, the data transmission method based on networks of multiple communications standards according to the embodiment may include:

501: Detect an air interface status parameter of a first communications standard network and an air interface status parameter of a second communications standard network.

502: In a case in which there is a communications standard network with an air interface status parameter less than a preset threshold, decrease a data packet sending rate of the communications standard network.

503: Allocate, according to a data packet sending rate of the first communications standard network and a data packet sending rate of the second communications standard network, a data packet to the first communications standard network and the second communications standard network for sending.

504: Detect the air interface status parameter of the communications standard network with the decreased data packet sending rate.

Specifically, it may be regularly determined whether there is a network with a decreased data packet sending rate by detecting whether there is a communications standard network with a data packet sending rate lower than an initial data packet sending rate of the communications standard network. When it is determined that there is a network with a decreased data packet sending rate, an air interface status parameter of the network is detected by using step 504. It may also be that execution of step 502 triggers step 504 to regularly detect an air interface status parameter of a network with a decreased data packet sending rate, and when the air interface status parameter of the network is not less than a preset threshold, step 505 is executed.

505: In a case in which the air interface status parameter of the communications standard network with the decreased data packet sending rate is not less than the preset threshold, increase the data packet sending rate of the communications standard network to a rate before the decrease.

Specifically, after the data packet sending rate of the communications standard network is increased, a data packet is allocated to the communications standard network according to an increased data packet sending rate.

According to the method of the embodiment, a radio link of a first communications standard network and a radio link of a second communications standard network are used, so that a data packet may be simultaneously delivered to a user by using the networks of the two communications standards together, thereby fully utilizing bandwidth of the first communications standard network and bandwidth of the second communications standard network and increasing a data transmission rate; in addition, by detecting an air interface link status of the first communications standard network and an air interface link status of the second communications standard network, data transmission rates of networks of multiple communications standards are adjusted flexibly and dynamically, thereby improving utilization efficiency of an air interface resource in the networks of the multiple communications standards.

Figure 6:
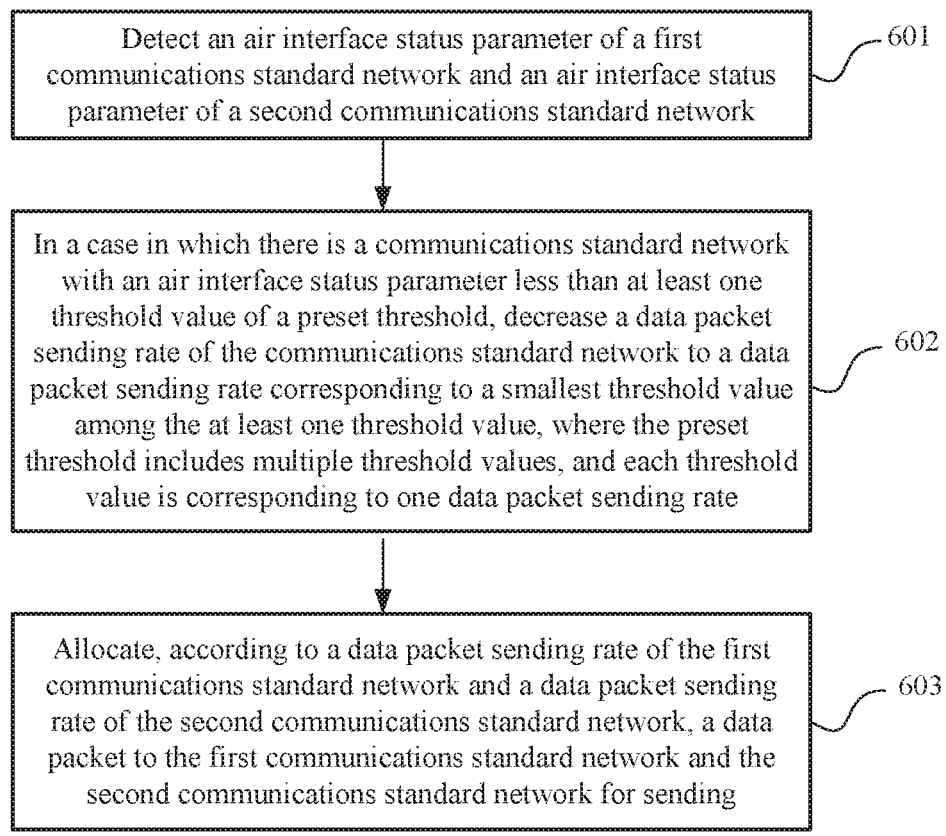
FIG. 6 is a schematic flowchart of a data transmission method based on networks of multiple communications standards according to another embodiment of the present invention.

FIG. 6 is a schematic flowchart of a data transmission method based on networks of multiple communications standards according to another embodiment of the present invention, and as shown in FIG. 6, the data transmission method based on networks of multiple communications standards according to the embodiment may include:

601: Detect an air interface status parameter of a first communications standard network and an air interface status parameter of a second communications standard network.

602: In a case in which there is a communications standard network with an air interface status parameter less than at least one threshold value of a preset threshold, decrease a data packet sending rate of the communications standard network to a data packet sending rate corresponding to a smallest threshold value among the at least one threshold value, where the preset threshold includes multiple threshold values, and each threshold value is corresponding to one data packet sending rate.

Specifically, multiple threshold values of a preset threshold of the first communications standard network, multiple threshold values of a preset threshold of the second communications standard network, and a data packet sending rate corresponding to each threshold value may be set separately; a quantity of the multiple threshold values of the preset threshold of the first communications standard network and a quantity of the multiple threshold values of the preset threshold of the second communications standard network may be the same or may be different.

603: Allocate, according to a data packet sending rate of the first communications standard network and a data packet sending rate of the second communications standard network, a data packet to the first communications standard network and the second communications standard network for sending.

According to the method of the embodiment, a radio link of a first communications standard network and a radio link of a second communications standard network are used, so that a data packet may be simultaneously delivered to a user by using the networks of the two communications standards together, thereby fully utilizing bandwidth of the first communications standard network and bandwidth of the second communications standard network and increasing a data transmission rate; in addition, by detecting an air interface link status of the first communications standard network and an air interface link status of the second communications standard network, data transmission rates of networks of multiple communications standards are adjusted flexibly and dynamically, thereby improving utilization efficiency of an air interface resource in the networks of the multiple communications standards.

Figure 7:
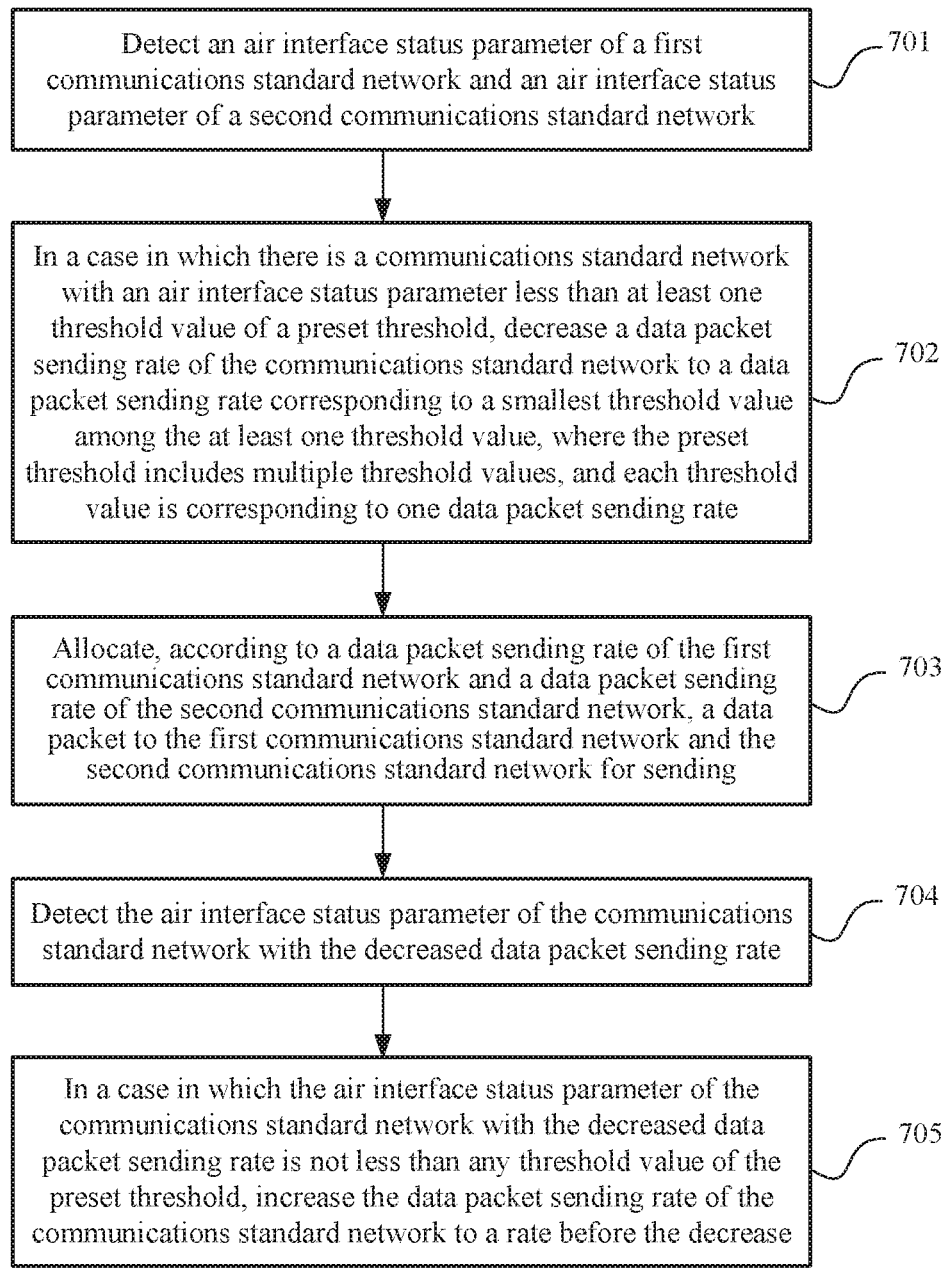
FIG. 7 is a schematic flowchart of a data transmission method based on networks of multiple communications standards according to another embodiment of the present invention.

FIG. 7 is a schematic flowchart of a data transmission method based on networks of multiple communications standards according to another embodiment of the present invention, and as shown in FIG. 7, the data transmission method based on networks of multiple communications standards according to the embodiment is an improvement of the method provided in FIG. 6. After a data packet sending rate of a communications standard network with an air interface status parameter less than a preset threshold is decreased by using the method provided in FIG. 6, the data packet sending rate of the network with a decreased sending rate needs to be increased in a timely manner, so that a bandwidth resource of networks of multiple communications standards can be fully and flexibly utilized.

701: Detect an air interface status parameter of a first communications standard network and an air interface status parameter of a second communications standard network.

702: In a case in which there is a communications standard network with an air interface status parameter less than at least one threshold value of a preset threshold, decrease a data packet sending rate of the communications standard network to a data packet sending rate corresponding to a smallest threshold value among the at least one threshold value, where the preset threshold includes multiple threshold values, and each threshold value is corresponding to one data packet sending rate.

703: Allocate, according to a data packet sending rate of the first communications standard network and a data packet sending rate of the second communications standard network, a data packet to the first communications standard network and the second communications standard network for sending.

704: Detect the air interface status parameter of the communications standard network with the decreased data packet sending rate.

Specifically, it may be regularly determined whether there is a communications standard network with a decreased data packet sending rate by detecting whether there is a communications standard network with a data packet sending rate lower than an initial data packet sending rate of the communications standard network. When it is determined that there is a communications standard network with a decreased data packet sending rate, an air interface status parameter of the communications standard network is detected by using step 704. It may also be that execution of step 702 triggers step 704 to regularly detect an air interface status parameter of a network with a decreased data packet sending rate.

705: In a case in which the air interface status parameter of the communications standard network with the decreased data packet sending rate is not less than any threshold value of the preset threshold, increase the data packet sending rate of the communications standard network to a rate before the decrease.

Specifically, after the data packet sending rate of the communications standard network is increased, a data packet is allocated to the communications standard network according to an increased data packet sending rate.

According to the method of the embodiment, a radio link of a first communications standard network and a radio link of a second communications standard network are used, so that a data packet may be simultaneously delivered to a user by using the networks of the two communications standards together, thereby fully utilizing bandwidth of the first communications standard network and bandwidth of the second communications standard network and increasing a data transmission rate; in addition, by detecting an air interface link status of the first communications standard network and an air interface link status of the second communications standard network, data transmission rates of networks of multiple communications standards are adjusted flexibly and dynamically, thereby improving utilization efficiency of an air interface resource in the networks of the multiple communications standards.

In the foregoing embodiments, the descriptions of the embodiments have their respective focuses. For a part that is not described in detail in an embodiment, reference may be made to related descriptions in other embodiments.

Figure 8:
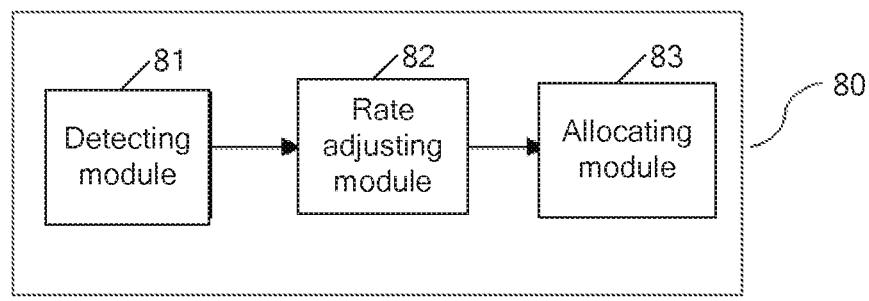
FIG. 8 is a schematic structural diagram of a data transmission apparatus based on networks of multiple communications standards according to another embodiment of the present invention.

FIG. 8 is a schematic structural diagram of a data transmission apparatus 80 based on networks of multiple communications standards according to another embodiment of the present invention, and as shown in FIG. 8, the apparatus 80 of the embodiment may include:

a detecting module 81, configured to detect an air interface status parameter of a first communications standard network and an air interface status parameter of a second communications standard network, and send a detecting result to a rate adjusting module 82;

the rate adjusting module 82, configured to: according to the detecting result of the detecting module 81, decrease a data packet sending rate of a communications standard network with an air interface status parameter less than a preset threshold in a case in which such a communications standard network exists, and send a determined data packet sending rate of the first communications standard network and a determined data packet sending rate of the second communications standard network to an allocating module 83, where:

specifically, for a communications standard network with an air interface status parameter not less than the preset threshold, the rate adjusting module 82 does not adjust a data packet sending rate of the communications standard network, and the communications standard network performs data packet sending at an initial data packet sending rate; and the allocating module 83, configured to allocate, according to the data packet sending rate of the first communications standard network and the data packet sending rate of the second communications standard network that are determined by the rate adjusting module 82, a data packet to the first communications standard network and the second communications standard network for sending.

In the embodiment, according to the data transmission apparatus 80 based on networks of multiple communications standards, the detecting module 81 detects an air interface status of the first communications standard network and an air interface status of the second communications standard network, and sends the detecting result to the rate adjusting module 82; the rate adjusting module 82 dynamically adjusts the data packet sending rate of the first communications standard network and the data packet sending rate of the second communications standard network according to the detecting result of the detecting module 81; and finally, the allocating module 83 allocates, according to the data packet sending rates determined by the rate adjusting module 82, a data packet to the first communications standard network and the second communications standard network.

Figure 9:
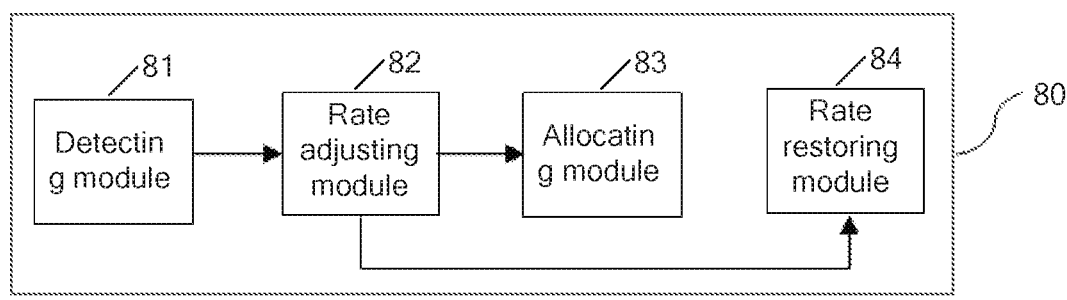
FIG. 9 is a schematic structural diagram of a data transmission apparatus based on networks of multiple communications standards according to another embodiment of the present invention.

Further, as shown in FIG. 9, the data transmission apparatus 80 based on networks of multiple communications standards provided by the embodiment may further include:

a rate restoring module 84, configured to: in a case in which an air interface status parameter of a communications standard network with a decreased data packet sending rate is not less than the preset threshold, increase the data packet sending rate of the communications standard network.

Specifically, it may be regularly determined whether there is a network with a decreased data packet sending rate by detecting whether there is a communications standard network with a data packet sending rate lower than an initial data packet sending rate of the communications standard network. When it is determined that there is a network with a decreased data packet sending rate, an air interface status parameter of the network is detected by using the rate restoring module 84, and it is determined, according to a detecting result, whether to increase the data packet sending rate of the communications standard network. It may also be that an execution result of the rate adjusting module 82 is used to trigger the rate restoring module 84 to regularly detect an air interface status parameter of a network with a decreased data packet sending rate, and it is determined, according to a detecting result, whether to increase the data packet sending rate of the communications standard network.

Figure 10:
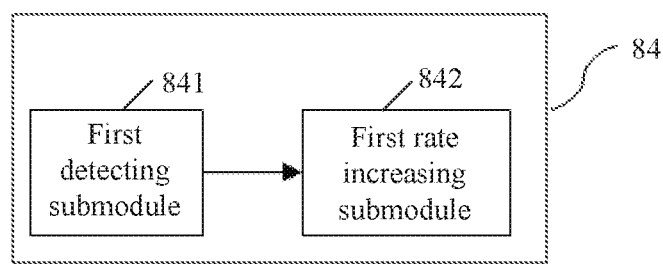
FIG. 10 is a schematic structural diagram of a rate restoring module in the apparatus illustrated in FIG. 9.

Optionally, as shown in FIG. 10, the rate restoring module 84 specifically includes:

a first detecting submodule 841, configured to detect the air interface status parameter of the communications standard network with the decreased data packet sending rate, and send a detecting result to a first rate increasing submodule 842; and the first rate increasing submodule 842, configured to: according to the detecting result of the first detecting submodule 841 and in a case in which the air interface status parameter of the communications standard network with the decreased data packet sending rate is not less than the preset threshold, increase the data packet sending rate of the communications standard network to a rate before the decrease.

According to the apparatus of the embodiment, a radio link of a first communications standard network and a radio link of a second communications standard network are used, so that a data packet may be simultaneously delivered to a user by using the networks of the two communications standards together, thereby fully utilizing bandwidth of the first communications standard network and bandwidth of the second communications standard network and increasing a data transmission rate; in addition, by detecting an air interface link status of the first communications standard network and an air interface link status of the second communications standard network, data transmission rates of networks of multiple communications standards are adjusted flexibly and dynamically, thereby improving utilization efficiency of an air interface resource in the networks of the multiple communications standards.

Figure 11:
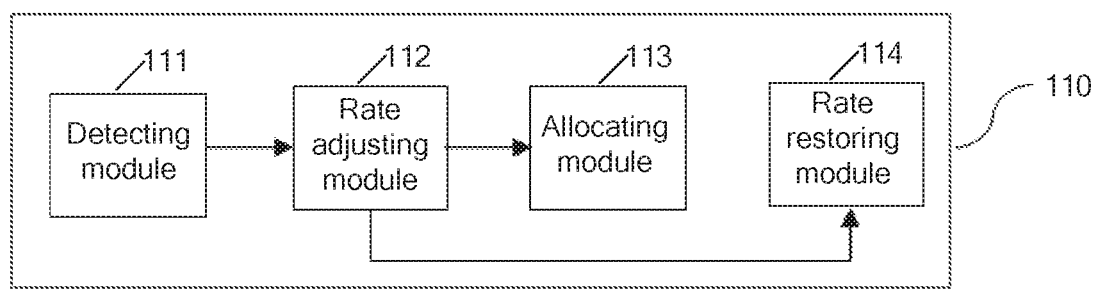
FIG. 11 is a schematic structural diagram of a data transmission apparatus based on networks of multiple communications standards according to another embodiment of the present invention.

FIG. 11 is a schematic structural diagram of a data transmission apparatus 110 based on networks of multiple communications standards according to another embodiment of the present invention, and as shown in FIG. 11, the apparatus 110 of the embodiment may include:

a detecting module 111, configured to detect an air interface status parameter of a first communications standard network and an air interface status parameter of a second communications standard network, and send a detecting result to a rate adjusting module 112;

the rate adjusting module 112, configured to: according to the detecting result of the detecting module 111 and in a case in which there is a communications standard network with an air interface status parameter less than at least one threshold value of a preset threshold, decrease a data packet sending rate of the communications standard network to a data packet sending rate corresponding to a smallest threshold value among the at least one threshold value, and send a determined data packet sending rate of the first communications standard network and a determined data packet sending rate of the second communications standard network to an allocating module 113, where the preset threshold includes multiple threshold values, and each threshold value is corresponding to one data packet sending rate, where:

specifically, for a communications standard network with an air interface status parameter not less than the preset threshold, the rate adjusting module 112 does not adjust a data packet sending rate of the communications standard network, and the communications standard network performs data packet sending at an initial data packet sending rate;

the allocating module 113, configured to allocate, according to the data packet sending rate of the first communications standard network and the data packet sending rate of the second communications standard network that are determined by the rate adjusting module 112, a data packet to the first communications standard network and the second communications standard network for sending; and a rate restoring module 114, configured to: in a case in which an air interface status parameter of a communications standard network with a decreased data packet sending rate is not less than the preset threshold, increase the data packet sending rate of the communications standard network.

Figure 12:
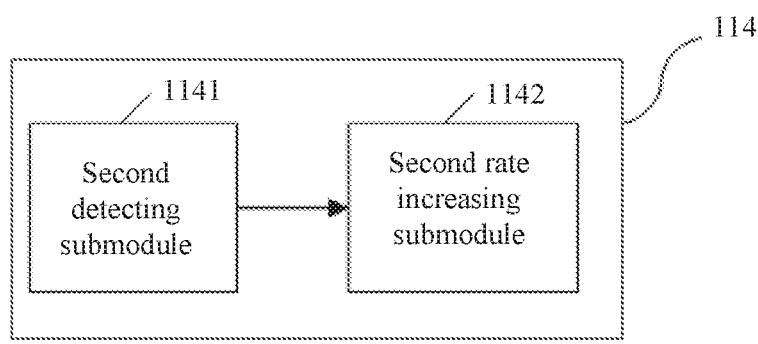
FIG. 12 is a schematic structural diagram of a rate restoring module in the apparatus illustrated in FIG. 11.

Optionally, as shown in FIG. 12, the rate restoring module 114 specifically includes:

a second detecting submodule 1141, configured to detect the air interface status parameter of the communications standard network with the decreased data packet sending rate, and send a detecting result to a second rate restoring submodule 1142; and a second rate increasing submodule 1142, configured to: according to the detecting result of the second detecting submodule 1141 and in a case in which the air interface status parameter of the communications standard network with the decreased data packet sending rate is not less than any threshold value of the preset threshold, increase the data packet sending rate of the communications standard network to a rate before the decrease.

According to the apparatus of the embodiment, a radio link of a first communications standard network and a radio link of a second communications standard network are used, so that a data packet may be simultaneously delivered to a user by using the networks of the two communications standards together, thereby fully utilizing bandwidth of the first communications standard network and bandwidth of the second communications standard network and increasing a data transmission rate; in addition, by detecting an air interface link status of the first communications standard network and an air interface link status of the second communications standard network, data transmission rates of networks of multiple communications standards are adjusted flexibly and dynamically, thereby improving utilization efficiency of an air interface resource in the networks of the multiple communications standards.

It may be clearly understood by persons skilled in the art that, for the purpose of convenient and brief description, for a detailed working process of the foregoing apparatus and module, reference may be made to a corresponding process in the foregoing method embodiments, and details are not described herein again.

In the several embodiments provided in the present invention, it should be understood that the disclosed method and apparatus may be implemented in other manners. For example, the described apparatus embodiment is merely exemplary. For example, the illustrated module division is merely logical function division and may be other division in actual implementation. For example, functional modules may be integrated into one processing module, or each of the modules may exist alone physically, or two or more modules may be integrated into one module. The integrated module may be implemented in a form of hardware, or may be implemented in a form of hardware in addition to a software functional module, or some features may be ignored or not performed.

In addition, persons of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may include: a magnetic disk, an optical disc, a read-only memory (Read-Only Memory, ROM for short), or a random access memory (Random Access Memory, RAM for short).

Figure 13:
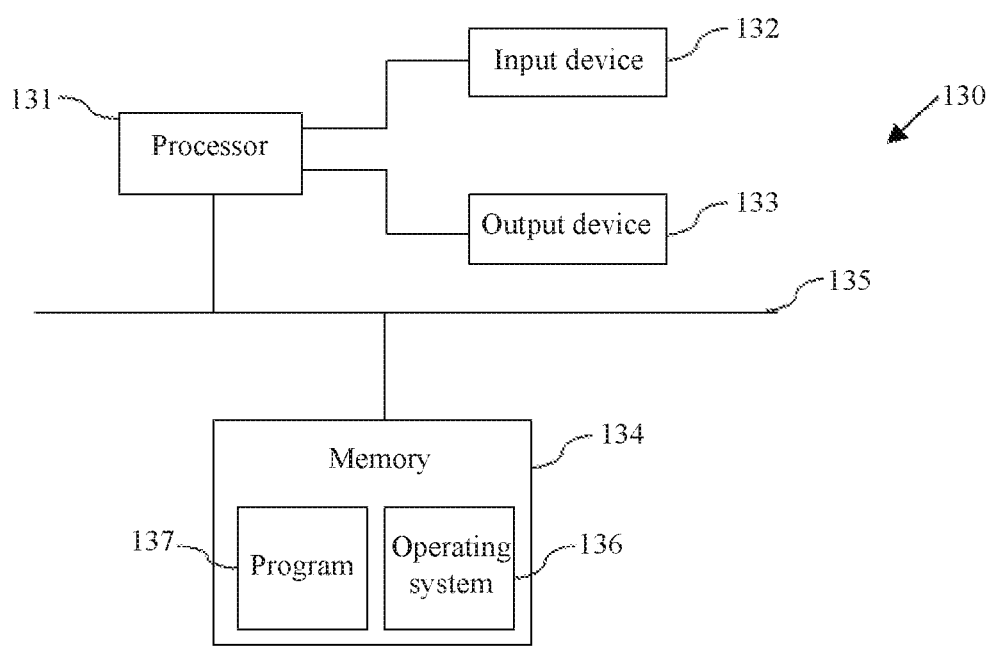
FIG. 13 is a schematic structural diagram of a data transmission apparatus based on networks of multiple communications standards according to another embodiment of the present invention.

The following provides embodiments in which all or some of the processes of the method in the present invention are completed by a computer program instructing relevant hardware. FIG. 13 is a schematic structural diagram of a data transmission apparatus 130 based on networks of multiple communications standards according to another embodiment of the present invention. As shown in FIG. 13, the apparatus 130 includes a processor 131, an input device 132, an output device 133, a memory 134, and a signal bus 135.

Specifically, the memory 134 includes:

an operating system 136, where the operating system 136 may be a program that controls an execution process of the processor 131; and a program 137 that implements the method of the present invention, where the program 137 may enable the processor 131 to complete the following: dynamically adjusting a user data packet sending rate of networks of multiple communications standards according to their respective air interface statuses of the networks of the multiple communications standards, and allocating a data packet to each communications standard network according to a user data packet sending rate of each communications standard network.

Figure 14:
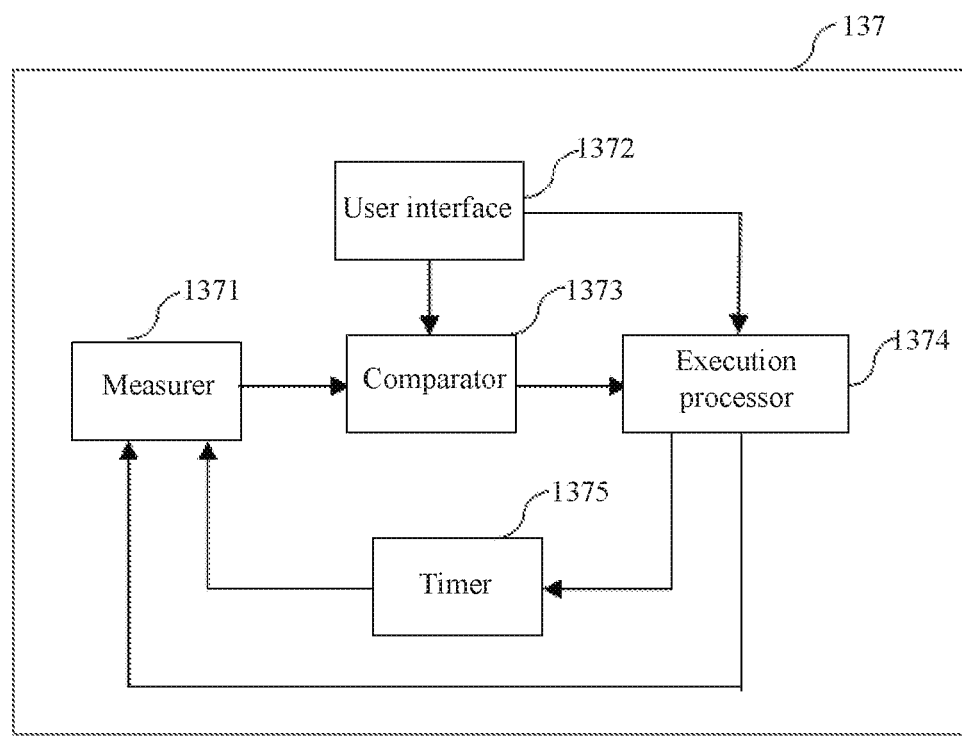
FIG. 14 shows a structural block diagram of a program that implements a method of the present invention and that is in the apparatus illustrated in FIG. 13.

FIG. 14 shows a structural block diagram of the program 137 that implements the method of the present invention, where the program 137 includes: a measurer 1371, a user interface 1372, a comparator 1373, and an execution processor 1374.

The measurer 1371 measures an air interface status parameter of a first communications standard network and an air interface status parameter of a second communications standard network, and sends a measurement result to the comparator 1373.

The user interface 1372 receives a threshold value and a data packet sending rate corresponding to the threshold value that are set by a user, sends the threshold value to the comparator 1373, and sends the data packet sending rate corresponding to the threshold value to the execution processor 1374.

The comparator 1373 compares the measured air interface status parameter of the first communications standard network and the measured air interface status parameter of the second communications standard network with the threshold value set by the user, and sends a comparison result to the execution processor 1374.

The execution processor 1374 is configured to: set a data packet sending rate of a communications standard network with an air interface status parameter less than the threshold value to the sending rate corresponding to the threshold value, determine a data packet sending rate of a communications standard network with an air interface status parameter not less than the threshold value to be an initial rate, and allocate a data packet to the first communications standard network and the second communications standard network separately according to a determined data packet sending rate.

Further, the program 137 may further include a timer 1375. After the execution processor 1374 decreases data packet sending rates of some communications standard networks, the timer 1375 is started, and information about the communications standard networks with decreased sending rates is sent to the measurer 1371, so that the timer 1375 regularly triggers the measurer 1371 to measure air interface status parameters of the communications standard networks with the decreased sending rates and to send a measurement result to the comparator 1373. The comparator 1373 compares the measured air interface status parameters of the communications standard networks with the decreased data packet sending rates with the threshold value that is set by the user, and sends a comparison result to the execution processor 1374. When the comparison result of the communications standard networks with the decreased data packet sending rates is that the air interface status parameters are greater than the threshold value, the execution processor 1374 increases the data packet sending rates of the communications standard networks, and allocates a data packet to the communications standard networks according to determined data packet sending rates.

According to the apparatus 130 of the embodiment, a radio link of a first communications standard network and a radio link of a second communications standard network are used, so that a data packet may be simultaneously delivered to a user by using the networks of the two communications standards together, thereby fully utilizing bandwidth of the first communications standard network and bandwidth of the second communications standard network and increasing a data transmission rate; in addition, by detecting an air interface link status of the first communications standard network and an air interface link status of the second communications standard network, data transmission rates of networks of multiple communications standards are adjusted flexibly and dynamically, thereby improving utilization efficiency of an air interface resource in the networks of the multiple communications standards.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A data transmission method, comprising:

detecting an air interface status parameter of a first communications standard network and an air interface status parameter of a second communications standard network;

decreasing a data packet sending rate of the first or second communications standard network when the corresponding air interface status parameter is less than a preset threshold, wherein the preset threshold comprises multiple threshold values, wherein each threshold value corresponds to one data packet sending rate, wherein decreasing the data packet sending rate of the first or second communications standard network comprises:

when the air interface status parameter of the first or second communications standard network is less than multiple threshold values of the preset threshold, decreasing the data packet sending rate of the first or second communications standard network to a data packet sending rate corresponding to a smallest threshold value among the threshold values;

increasing a data packet sending rate of the first or second communications standard network when the first or second communication standard network has a decreased data packet sending rate and the air interface status parameter of the first or second communications standard network is not less than the preset threshold; and allocating, according to the data packet sending rate of the first communications standard network and the data packet sending rate of the second communications standard network, a data packet to the first communications standard network and the second communications standard network for sending.

2. The data transmission method according to claim 1, wherein increasing the data packet sending rate of the first or second communications standard network comprises:
  detecting the air interface status parameter of the communications standard network with the decreased data packet sending rate; and
  in response to detecting that the air interface status parameter of the communications standard network with the decreased data packet sending rate is not less than any threshold value of the preset threshold, increasing the data packet sending rate of the communications standard network to a rate used before the decreased data packet sending rate.

3. The data transmission method according to claim 1, wherein, when the air interface status parameter is not less than the preset threshold, the data packet sending rate of the first or second communications standard network is not adjusted.

4. The data transmission method according to claim 3, wherein, when the air interface status parameter is not less than the preset threshold, the data packet sending rate of the first or second communications standard network is not adjusted, such that the first or second communications standard network with the air interfaces status parameter not less than the preset threshold performs data packet sending at an initial data packet sending rate.

5. The data transmission method according to claim 1, wherein, the detecting of the air interface status parameter on the first communications standard network is separately performed from detecting the air interface status parameter on the second communications standard network.

6. The data transmission method according to claim 1, wherein the air interface status parameter of the first and second communications standard networks includes forward signal-to-noise ratios at multimode access points.

7. A data transmission apparatus, comprising:
  a processor; and
  a computer-readable storage medium storing a program to be executed by the processor, the program comprising instructions for configuring the processor to:
    detect an air interface status parameter of a first communications standard network and an air interface status parameter of a second communications standard network;
    decrease a data packet sending rate of the first or second communications standard network when the corresponding air interface status parameter is less than a preset threshold, wherein the preset threshold comprises multiple threshold values, wherein each threshold value corresponds to one data packet sending rate, wherein decreasing the data packet sending rate of the first or second communications standard network comprises:
      when the air interface status parameter of the first or second communications standard network is less than multiple threshold values of the preset threshold, decreasing the data packet sending rate of the first or second communications standard network to a data packet sending rate corresponding to a smallest threshold value among the threshold values;
    increase a data packet sending rate of the first or second communications standard network when the first or second communication standard network has a decreased data packet sending rate and the air interface status parameter of the first or second communications standard network is not less than the preset threshold; and
    allocate, according to the data packet sending rate of the first communications standard network and the data packet sending rate of the second communications standard network, a data packet to the first communications standard network and the second communications standard network for sending.

8. The data transmission apparatus according to claim 7, wherein increasing the data packet sending rate of the first or second communications standard network comprises:
  detecting the air interface status parameter of the communications standard network with the decreased data packet sending rate; and
  in response to detecting that the air interface status parameter of the communications standard network with the decreased data packet sending rate is not less than any threshold value of the preset threshold, increasing the data packet sending rate of the communications standard network to a rate used before the decreased data packet sending rate.

9. The data transmission apparatus according to claim 7, wherein, when the air interface status parameter is not less than the preset threshold, the data packet sending rate of the first or second communications standard network is not adjusted.

10. The data transmission apparatus according to claim 9, wherein, when the air interface status parameter is not less than the preset threshold, the data packet sending rate of the first or second communications standard network is not adjusted, such that the first or second communications standard network with the air interfaces status parameter not less than the preset threshold performs data packet sending at an initial data packet sending rate.

11. The data transmission apparatus according to claim 7, wherein, the detecting of the air interface status parameter on the first communications standard network is separately performed from detecting the air interface status parameter on the second communications standard network.

12. The data transmission apparatus according to claim 7, wherein the air interface status parameter of the first and second communications standard networks includes forward signal-to-noise ratios at multimode access points.

13. A non-transitory computer-readable medium having instructions stored therein, which when executed by a processor, cause the processor to perform a data transmission method, the method comprising:
  detecting an air interface status parameter of a first communications standard network and an air interface status parameter of a second communications standard network;
  decreasing a data packet sending rate of the first or second communications standard network when the corresponding air interface status parameter is less than a preset threshold, wherein the preset threshold comprises multiple threshold values, wherein each threshold value corresponds to one data packet sending rate, wherein decreasing the data packet sending rate of the first or second communications standard network comprises:
    when the air interface status parameter of the first or second communications standard network is less than multiple threshold values of the preset threshold, decreasing the data packet sending rate of the first or second communications standard network to a data packet sending rate corresponding to a smallest threshold value among the threshold values;

increasing a data packet sending rate of the first or second communications standard network when the first or second communication standard network has a decreased data packet sending rate and the air interface status parameter of the first or second communications standard network is not less than the preset threshold; and allocating, according to the data packet sending rate of the first communications standard network and the data packet sending rate of the second communications standard network, a data packet to the first communications standard network and the second communications standard network for sending.

14. The computer-readable medium according to claim 13, wherein increasing the data packet sending rate of the first or second communications standard network comprises:

detecting the air interface status parameter of the communications standard network with the decreased data packet sending rate; and in response to detecting that the air interface status parameter of the communications standard network with the decreased data packet sending rate is not less than any threshold value of the preset threshold, increasing the data packet sending rate of the communications standard network to a rate used before the decreased data packet sending rate.

15. The computer-readable medium according to claim 13, wherein, when the air interface status parameter is not less than the preset threshold, the data packet sending rate of the first or second communications standard network is not adjusted.

16. The computer-readable medium according to claim 15, wherein, when the air interface status parameter is not less than the preset threshold, the data packet sending rate of the first or second communications standard network is not adjusted, such that the first or second communications standard network with the air interfaces status parameter not less than the preset threshold performs data packet sending at an initial data packet sending rate.

17. The computer-readable medium according to claim 13, wherein, the detecting of the air interface status parameter on the first communications standard network is separately performed from detecting the air interface status parameter on the second communications standard network.

18. The computer-readable medium according to claim 13, wherein the air interface status parameter of the first and second communications standard networks includes forward signal-to-noise ratios at multimode access points.

* * * * *